Figure 1:
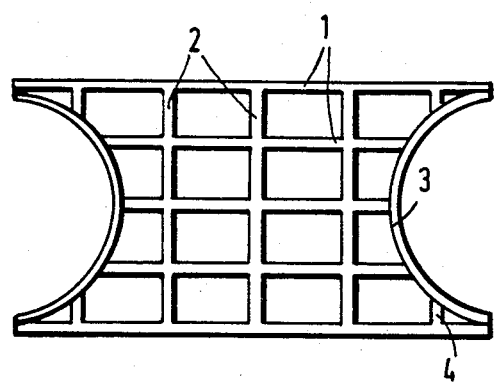

United States Patent [19]

Billet et al.

[11] Patent Number: 4,537,731

[45] Date of Patent: Aug. 27, 1985

[54] SADDLE FILLING MEMBER FOR GAS-LIQUID CONTACT

[75] Inventors: Reinhard Billet, Bochum; Rainer Kober, Steinwiesen; Jerzy Ma kowiak, Bochum; Werner Geipel, Steinwiesen, all of Fed. Rep. of Germany

[73] Assignee: Paul Rauschert GmbH & Co. KG, Pressig, Fed. Rep. of Germany

[21] Appl. No.: 498,557

[22] Filed: May 26, 1983

[30] Foreign Application Priority Data

Jun. 4, 1982 [DE] Fed. Rep. of Germany ......... 3221130

[51] Int. Cl.³ ................................................. B01F 3/04
[52] U.S. Cl. ....................................... 261/94; D23/4; 261/DIG. 72
[58] Field of Search ....................................... 261/94–98, 261/DIG. 72; 202/158; 210/150; 55/90, 233; D23/4

[56] References Cited

U.S. PATENT DOCUMENTS

| D. 232,174 | 7/1974 | La Borde | 261/DIG. 72 |
| 1,796,501 | 3/1931 | Berl | 261/DIG. 72 |
| 3,484,513 | 12/1969 | Paoli | 261/DIG. 72 |
| 3,506,248 | 4/1970 | Starbuck et al. | 261/DIG. 72 |
| 4,086,307 | 4/1978 | Glaspie | 210/150 X |
| 4,122,011 | 10/1978 | Strigle, Jr. | 261/DIG. 72 |
| 4,203,935 | 5/1980 | Hackenjos | 261/DIG. 72 |
| 4,277,425 | 7/1981 | Leva | 261/DIG. 72 |

FOREIGN PATENT DOCUMENTS

| 1769581 | 2/1973 | Fed. Rep. of Germany | 261/DIG. 72 |
| 52-10104 | 3/1977 | Japan | 261/DIG. 72 |
| 55193 | 6/1968 | Poland | 261/DIG. 72 |
| 1430233 | 3/1976 | United Kingdom | 261/DIG. 72 |
| 2061756 | 5/1981 | United Kingdom | 261/DIG. 72 |

Primary Examiner—Richard L. Chiesa
Attorney, Agent, or Firm—Michael L. Dunn; Howard M. Ellis

[57] ABSTRACT

Column packing for gas-liquid contact comprises a saddle with a net-like matrix structure formed from a plurality of intersecting ribs provide substantially improved material transfer, gas permeability and reduced pressure losses.

6 Claims, 5 Drawing Figures

SADDLE FILLING MEMBER FOR GAS-LIQUID CONTACT

Saddle filling members for gas-liquid contact are disclosed for example in German patent specification No. 1 769 581 and are in the form of a segment of the inner peripheral portion of a hollow toroid, and have oppositely disposed side surfaces which extend outwardly from the axis of the toroid, a convex inner peripheral surface being disposed between said side surfaces, towards the axis of the toroid, and a concave outer peripheral surface being disposed between said side surfaces, away from the axis of the toroid.

Based on that known construction of the saddle filling member, the present invention is based on the problem of providing saddle filling members which produce an increased material transfer and which have enhanced gas permeability.

The saddle filling members for gas-liquid contact, according to the present invention, are characterised in that it comprises a plurality of first ribs which are arranged parallel to each other and which are arcuately curved towards one side, and a plurality of second ribs which are arranged parallel to each other and normal to the first ribs and which are arcuately curved towards the opposite side, and also two arcuately curved connecting web portions which interconnect the end regions of the first ribs, the ribs being of a sharp-edged configuration.

The above-indicated net-like structure of the saddle filling members results in an increase in the drip-off surface areas and drip-off locations, as well as providing a much greater number of contact locations, than in the case of known saddle filling members. A filling of the saddle filling members according to the invention contains substantially more individual members than a filling of conventional saddle filling members. Gas permeability is substantially increased, in comparison with known saddle filling members.

The advantages resulting therefrom are an enhanced material transfer, increased gas permeability, reduced pressure loss, lower energy requirement for the fans required for blowing the gases therethrough, and considerably higher through-put in respect of gas and liquid.

The curved ribs of the saddle filling member according to the invention may be of any cross-section, such as round or polygonal, for example square or rectangular. It is particularly desirable for the arcuately curved ribs to be of a plate-like configuration, that is to say, they are greater in height, in the direction of the plane of curvature, than in width. Desirably, the ratio of height to width of the plate-like ribs is 1.5 to 5:1.

Ribs which are of a plate-like configuration in that way provide increased drain surfaces, which enhances the effectiveness of the filling members according to the invention.

The number of first and second arcuately curved ribs is usually so selected that, in the resulting grid-like structure, the openings formed between the ribs have an area in the region of about 0.5 to 2 cm². For that purpose, with the usual sizes of filling members, three ribs can advantageously be provided, between the two curved connecting web portions, with five ribs disposed normal to the three ribs.

The saddle filling members according to the invention may comprise a plastic material or metal. The sharp-edged configuration thereof is obtained, when using plastic materials, by injection moulding, and that sharp-edged configuration is important for the increased material transfer. That factor is further improved if the ribs which are of a plate-like configuration, as set out above, are of a substantially triangular cross-section which on the one hand imparts good stability to the filling member and on the other hand allows the ribs to terminate with a relatively sharp pointed edge.

In addition, it is preferable for the filling member to have an increased number of drip-off points, in the form of pointed drip-off tip portions, in addition to the grid-like configuration of the saddle filling member structure. For that purpose, it is desirable for the first ribs which are arranged normal to the connecting web portions to be arranged to project beyond the connecting web portions, forming drip-off tip portions, and/or for the second ribs which are normal thereto to be arranged to project beyond the two outermost first ribs, forming drip-off tip portions. The free end of each rib, which projects in that way, forms a drip-off location which further enhances the increase in material transfer of the filling members according to the invention.

Figure 3:
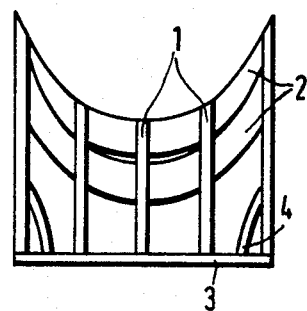
Figure 2:
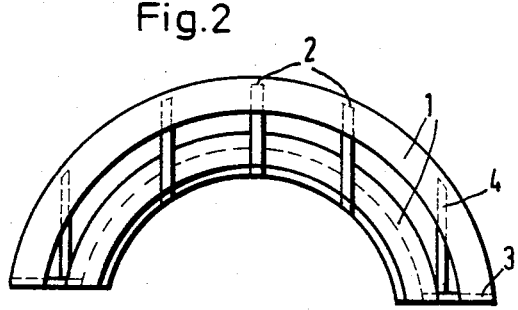
Figure 4:
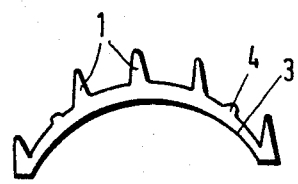

In the drawing:

FIG. 1 shows a plan view of a first embodiment of a saddle filling member according to the invention, FIG. 2 shows a side view of the saddle filling member shown in FIG. 1, FIG. 3 shows a front view of the saddle filling member shown in FIGS. 1 and 2, FIG. 4 shows a plan view of one of the connecting web portions of the saddle filling member shown in FIGS. 1 to 3, and FIG. 5 shows a plan view corresponding to that shown in FIG. 1, of another embodiment of a saddle filling member according to the present invention.

The saddle filling or packing member illustrated in FIGS. 1 through 4 is of a net-like or grid-like structure comprising a group of mutually parallel first ribs 1 and a group of mutually parallel second ribs 2 which are disposed normal to the first ribs. In the position of the filling member shown in FIGS. 1 through 4, the first ribs 1 are arcuately curved downwardly and thus, in the view shown in FIG. 1, are curved upwardly beyond the plane of the paper.

As shown in FIG. 3, in comparison, the ribs 2 are curved downwardly, in the illustrated position of the filling member. In the view shown in FIG. 1, the connecting web portions 3 are disposed in the plane of the paper in which they are curved in an arcuate configuration.

Reinforcing web portions 4 are additionally provided in the corner regions of the filling member shown in FIGS. 1 through 4, from the respective outermost rib 1 to the adjacent connecting web portion 3.

FIGS. 2 and 3 show that both the ribs 1 and the ribs 2 are of a plate-like configuration, that is to say, they are of greater height, normal to the plane of the paper, than their width, in the plane of the paper. FIG. 4 also shows that the ribs are of substantially triangular cross-section and thus terminate in a blade-like configuration at their free edges which, in the views shown in FIGS. 1 and 2, point downwardly.

Figure 5:
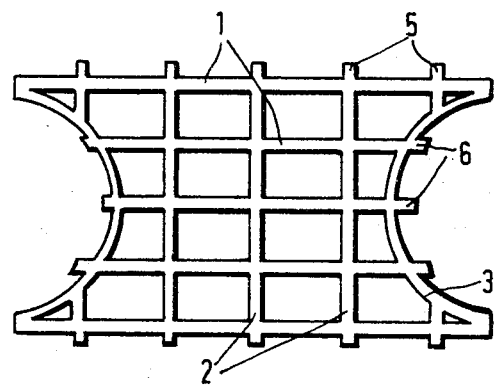

The embodiment shown in FIG. 5 differs from that illustrated in FIGS. 1 through 4 only in that it has additional drip-off pointed tip portions 5 and 6. The tip portions 5 are formed in such a way that the ribs 2 project beyond the respective outermost ribs 1, while the tip portions 6 are formed by a portion of the ribs 1 extending beyond the connecting web portions 3.

The openings in the grid-like structure between the ribs 1 and the ribs 2 are of the order of magnitude of about 1 cm$^2$, which is an advantageous size of aperture.

We claim:

1. A saddle filling member for gas-liquid contact, characterized in that it comprises a plurality of first ribs which are arranged parallel to each other and which are arcuately curved towards one side, and a plurality of second ribs which are arranged parallel to each other and normal to the first ribs and which are arcuately curved towards the opposite side, and also two arcuately curved connecting web portions which interconnect the end regions of the first ribs, the ribs being of a sharp-edged configuration and forming with said connecting web portions a grid-like structure over all the surfaces of said member.

2. A saddle filling member according to claim 1 characterized in that the first and second ribs are of a plate-like configuration.

3. A saddle filling member according to claim 2 characterized in that the plate-like ribs have a ratio of height to width of 1.5 to 5:1.

4. A saddle filling member according to claim 2 or 3 characterized in that the plate-like ribs are of substantially triangular cross-section.

5. A saddle filling member according to claim 1, 2 or 3 characterized in that at least a part of the first ribs project beyond the connecting web portions, forming drip-off tip portions.

6. A saddle filling member according to claim 1, 2 or 3 characterized in that at least a part of the second ribs project beyond the outermost first ribs, forming drip-off tip portions.

* * * * *